United States Patent
Delano et al.

(10) Patent No.: US 11,728,730 B2
(45) Date of Patent: Aug. 15, 2023

(54) CONTINUOUS CONDUCTION MODE SIMO DEVICE

(71) Applicant: Maxim Integrated Products, Inc., San Jose, CA (US)

(72) Inventors: Cary Delano, Los Altos, CA (US); Gaurav Mital, Fremont, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 17/698,239

(22) Filed: Mar. 18, 2022

(65) Prior Publication Data
US 2022/0209668 A1 Jun. 30, 2022

Related U.S. Application Data

(63) Continuation of application No. 16/415,419, filed on May 17, 2019, now Pat. No. 11,336,178.

(60) Provisional application No. 62/798,129, filed on Jan. 29, 2019.

(51) Int. Cl.
*H02M 3/157* (2006.01)
*H02M 1/00* (2006.01)

(52) U.S. Cl.
CPC ............ *H02M 3/157* (2013.01); *H02M 1/009* (2021.05)

(58) Field of Classification Search
CPC .............................. H02M 3/157; H02M 1/009
See application file for complete search history.

(56) References Cited

U.S. PATENT DOCUMENTS

| | | |
|---|---|---|
| 8,049,472 B2 | 11/2011 | Easwaran et al. |
| 8,624,429 B2 | 1/2014 | Jing et al. |
| 9,007,039 B2 | 4/2015 | Kim et al. |
| 9,628,033 B2 | 4/2017 | King et al. |
| 9,634,566 B2 | 4/2017 | King et al. |
| 9,654,056 B2 | 5/2017 | Amadi et al. |
| 9,698,732 B2 | 7/2017 | Maru et al. |
| 9,991,793 B2 | 6/2018 | Yamada et al. |
| 10,505,454 B2 | 12/2019 | Zhao et al. |
| 2005/0264271 A1 | 12/2005 | Lam et al. |
| 2012/0062031 A1 | 3/2012 | Buthker |

(Continued)

OTHER PUBLICATIONS

Ming-Hsin Huang ; Ke-Horng Chen : Single-Inductor Multi-Output (SIMO) DC-DC Converters With High Light-Load Efficiency and Minimized Cross-Regulation for Portable Devices. In: IEEE Journal of Solid-State Circuits, vol. 44 , Issue: 4 , Apr. 2009, 1099-1111.

(Continued)

*Primary Examiner* — Ryan Johnson
*Assistant Examiner* — Colleen J O Toole (57) ABSTRACT

A power converter is disclosed. The power converter includes a Single-Input-Multiple-Output (SIMO) device includes a first transistor connected to an input and a first end of an inductor, a second transistor connected to a second end of the inductor and a first output, and a third transistor connected to the second end of the inductor and a second output. The power converter also includes a controller connected to the SIMO device and is configured to maintain a minimum inductor current through the inductor between charging cycles and to cause the minimum inductor current to transition to a charging inductor current during a charging cycle. The charging inductor current is based on a difference between an output voltage signal and a target voltage signal.

20 Claims, 7 Drawing Sheets

(56) References Cited

U.S. PATENT DOCUMENTS

| | | |
|---|---|---|
| 2016/0308445 A1 | 10/2016 | King et al. |
| 2017/0040895 A1 | 2/2017 | May et al. |
| 2017/0141603 A1 | 5/2017 | King et al. |
| 2017/0141675 A1 | 5/2017 | King et al. |
| 2017/0179895 A1 | 6/2017 | King et al. |
| 2017/0207755 A1 | 7/2017 | He et al. |
| 2017/0207759 A1 | 7/2017 | He et al. |
| 2020/0244167 A1 | 7/2020 | Delano et al. |

OTHER PUBLICATIONS

Nayana. A, Prof. A. Mala: Comparative Study of Closed Loop Analysis of Single Inductor Dual Output Buck Converter with Mix-Voltage Conversion Using PI and Fuzzy Controllers. In: International Journal of Innovative Research in Science, Engineering and Technology, vol. 3, Special Issue 1, Jan. 2014, 821-830.—ISSN 2347-6710.

German Office Action dated May 6, 2021 for German Application No. 10 2020 101 423.6. Machine Translation provided.

Chinese Office Action dated Jan. 5, 2023 for Chinese Application No. 201911372223.X. Machine Translation provided.

CONTINUOUS CONDUCTION MODE SIMO DEVICE

CROSS-REFERENCE TO RELATED APPLICATIONS

The present disclosure is a continuation of U.S. patent application Ser. No. 16/415,419 filed on May 17, 2019, which claims the benefit of U.S. Provisional Application No. 62/798,129, filed on Jan. 29, 2019. The entire disclosure of the application referenced above is incorporated herein by reference.

FIELD

The present disclosure relates to power converters, and more particularly to Single-Inductor-Multiple-Output (SIMO) devices that provide power to powered devices.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Typically, battery powered consumer devices require more than one power supply voltage level to operate. For example, a processor may operate at a first voltage level while one or more peripherals may operate at a second voltage level. As a result, these devices incorporate power converters to convert electric energy from one form to another. For example, power converters may be used to convert a direct current (DC) or a rectified alternating current (AC) input signal to one or more DC output signals at the same or different power levels. Power converters can include Single-Input-Multiple-Output (SIMO) devices that store current in a single inductor based on an input signal and selectively discharging the stored current to multiple loads connected to selected outputs of the of the SIMO device. SIMO devices can also be referred to as Single-Inductor-Multiple-Output devices.

SUMMARY

A power converter is disclosed. The power converter includes a Single-Input-Multiple-Output (SIMO) device includes a first transistor connected to an input and a first end of an inductor, a second transistor connected to a second end of the inductor and a first output, and a third transistor connected to the second end of the inductor and a second output. The power converter also includes a controller connected to the SIMO device and is configured to maintain a minimum inductor current through the inductor between charging cycles and to cause the minimum inductor current to transition to a charging inductor current during a charging cycle. The charging inductor current is based on a difference between an output voltage signal and a target voltage signal.

In other features, the controller includes an integrator that is configured to generate a minimum inductor current signal that is based on a difference between (1) the output voltage signal provided by at least one of the first output and the second output and (2) the target voltage signal.

In other features, the controller is configured to generate a charging inductor current signal based on the minimum inductor current signal and a target current peak signal.

In other features, the charging inductor current signal comprises a root-mean-square (RMS) of the minimum inductor current and the target current peak signal.

In other features, the controller further comprises a squaring device configured to generate a squared minimum inductor current signal and a squared target current peak signal, a summer connected to an output of the squaring device and configured to generate a summed signal based on the squared minimum inductor current signal and the squared target current peak signal, and a square root device that is connected to an output of the summer and configured to generate the target current peak signal based on the summed signal.

In other features, the squaring device comprises at least one of a frequency mixer and a multiplier.

In other features, the square root device comprises at least one of a translinear amplifier and a look-up table.

In other features, the controller further comprises an analog-to-digital converter connected to an output of the integrator and configured to generate a digital representation of the minimum inductor current, and the squaring device is connected to an output of the analog-to-digital converter. The controller also includes a digital-to-analog converter connected to an output of the square root device and configured to generate an analog representation of the target current peak signal.

In other features, the target current peak signal comprises a programmable direct current (DC) signal representing a target current peak setting for at least one of the first output and the second output.

A power converter is disclosed. The power converter includes a Single-Input-Multiple-Output (SIMO) device includes a first transistor connected to an input and a first end of an inductor, a second transistor connected to a second end of the inductor and a first output, and a third transistor connected to the second end of the inductor and a second output. The power converter also includes a controller connected to the SIMO device and configured to maintain a minimum inductor current through the inductor between charging cycles and to cause the minimum inductor current to transition to (1) a first charging inductor current during a first charging cycle corresponding to the first output and (2) to a second charging inductor current during a second charging cycle corresponding to the second output. The first charging inductor current is based on a difference between a first output voltage signal at the first output and a first target voltage signal for the first output and the second charging inductor current is based on a difference between a second output voltage signal at the second output and a second target voltage signal for the second output.

In other features, the controller includes an integrator that is configured to generate a minimum inductor current signal that is based on the difference between (1) the output voltage signal provided by at least one of the first output and the second output and (2) the target voltage signal for the at least one of the first output and the second output.

In other features, the controller is configured to generate a first charging inductor current signal based on the minimum inductor current signal and a target current peak signal for the first output.

In other features, the first charging inductor current signal comprises a root-mean-square (RMS) of the minimum inductor current and the target current peak signal for the first output.

In other features, the controller further comprises a squaring device configured to generate a squared minimum inductor current signal and a squared target current peak signal corresponding to the first output, a summer connected to an output of the squaring device and configured to generate a summed signal based on the squared minimum inductor current signal and the squared target current peak signal, and a square root device that is connected to an output of the summer and configured to generate the target current peak signal for the first output based on the summed signal.

In other features, the squaring device comprises at least one of a frequency mixer and a multiplier.

In other features, the square root device comprises at least one of a translinear amplifier and a look-up table.

In other features, the controller further comprises an analog-to-digital converter connected to an output of the integrator and configured to generate a digital representation of the minimum inductor current, and the squaring device is connected to an output of the analog-to-digital converter. The controller also includes a digital-to-analog converter connected to an output of the square root device and configured to generate an analog representation of the target current peak signal.

In other features, the wherein the squaring device is connected to an output of the integrator.

In other features, the target current peak signal comprises a programmable direct current (DC) signal representing a target current peak setting for at least one of the first output and the second output.

In other features, the controller is configured to generate a second charging inductor current signal based on the minimum inductor current signal and a target current peak signal for the second output.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

SIMO devices use a single inductor to store energy and to power multiple electrical loads. The inductor is powered during a first time period and provides power to an electrical load connected to one of multiple outputs of the SIMO during a second time period. SIMO devices can be operated in continuous conduction mode (CCM) and discontinuous conduction mode (DCM). In DCM, the inductor current drops to zero and remains at zero until the next switching cycle begins. In CCM, the inductor current is ramped down to a minimum inductor current ($I_{add}$) that stays above zero between switching cycles.

However, the SIMO can experience inter-channel oscillations while operating in CCM. For example, inductor current from a previous pulsing cycle may influence the next pulsing cycle that results in more or less energy from the inductor than desired. That, in turn, can result in the wrong pulse energy for the next pulse and it can continue into oscillation. The present disclosure is directed to a power converter that includes a SIMO device and a controller that controls $I_{add}$ (e.g., the valley of the inductor current) through the inductor during and between charging cycles. The controller also causes $I_{add}$ to affect the magnitude of the charging inductor current during charging cycles. The charging inductor current is based on the desired current level and/or voltage output corresponding to the outputs of the SIMO device.

Figure 1:
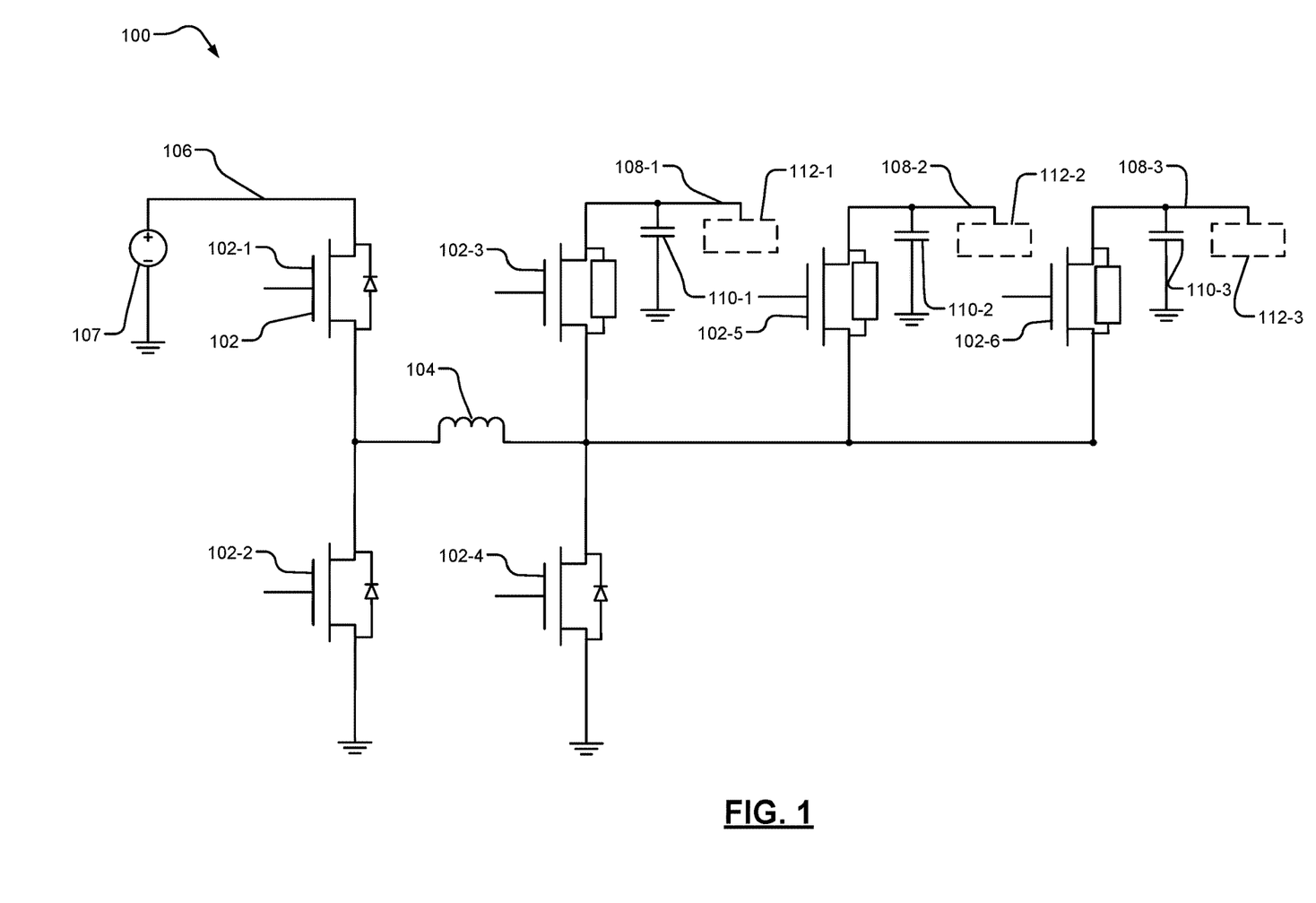
FIG. 1 is a schematic diagram illustrating a SIMO in accordance with an example implementation of the present disclosure.

FIG. 1 illustrates an example schematic diagram of a SIMO device 100 in accordance with the present disclosure. The SIMO device 100 includes multiple transistors 102 and an inductor 104. In implementations, the transistors 102 can include metal-oxide-semiconductor field-effect transistors (MOSFETs), although other transistors can be used such as DMOS devices or HEMTs. As shown, the SIMO device 100 includes a first transistor 102-1, a second transistor 102-2, a third transistor 102-3, a fourth transistor 102-4, a fifth transistor 102-5, and a sixth transistor 102-6. However, it is understood that the SIMO device 100 can include a varying number of transistors to provide additional or fewer outputs based upon the configuration of the SIMO. The third transistor 102-3, the fifth transistor 102-5, and the sixth transistor 102-6 comprise well-switching devices. If DMOS devices are used, series devices can be used in place of these single devices in order to prevent undesired body diodes from effecting the operation.

The SIMO device 100 receives control signals at the gates of the transistors 102-1 through 102-6 to control charging, discharging, or holding of the inductor 104. For example, based upon the control signals in buck-boost mode, power is transferred to the inductor 104 using the first transistor 102-1 and the fourth transistor 102-4, and power is transferred from the inductor 104 using the second transistor 102-2 and one of the third transistor 102-3, the fifth transistor 102-5, or the sixth transistor 102-6 to provide current to a selected output 108-1, 108-2, 108-3 that charges a corresponding capacitor 110-1, 110-2, 110-3. As shown, the first transistor 102-1 is connected to an input 106 to receive an input signal from a power source 107. Similarly, buck mode can be implemented by toggling 102-1 and 102-2 and selecting between 102-3, 102-5 or 102-6. Also, boost mode can be implemented by holding on 102-1, then turning on 102-4. Subsequently, 102-4 is turned off and either 102-3, 102-5 or 102-6 is turned on.

The third transistor 102-3, the fifth transistor 102-5, and the sixth transistor 102-6 are connected to outputs 108-1, 108-2, 108-3, respectively. In some examples, each output 108-1, 108-2, 108-3 is connected to a respective capacitor 110-1, 110-2, 110-3. The capacitors 110-1, 110-2, 110-3 are charged to a desired voltage level by the inductor 104 based upon the control signals. The capacitors 110-1, 110-2, 110-3 can power one or more electronic loads 112-1, 112-2, 112-3, which are connected to the respective capacitors 110-1, 110-2, 110-3.

Figure 2:
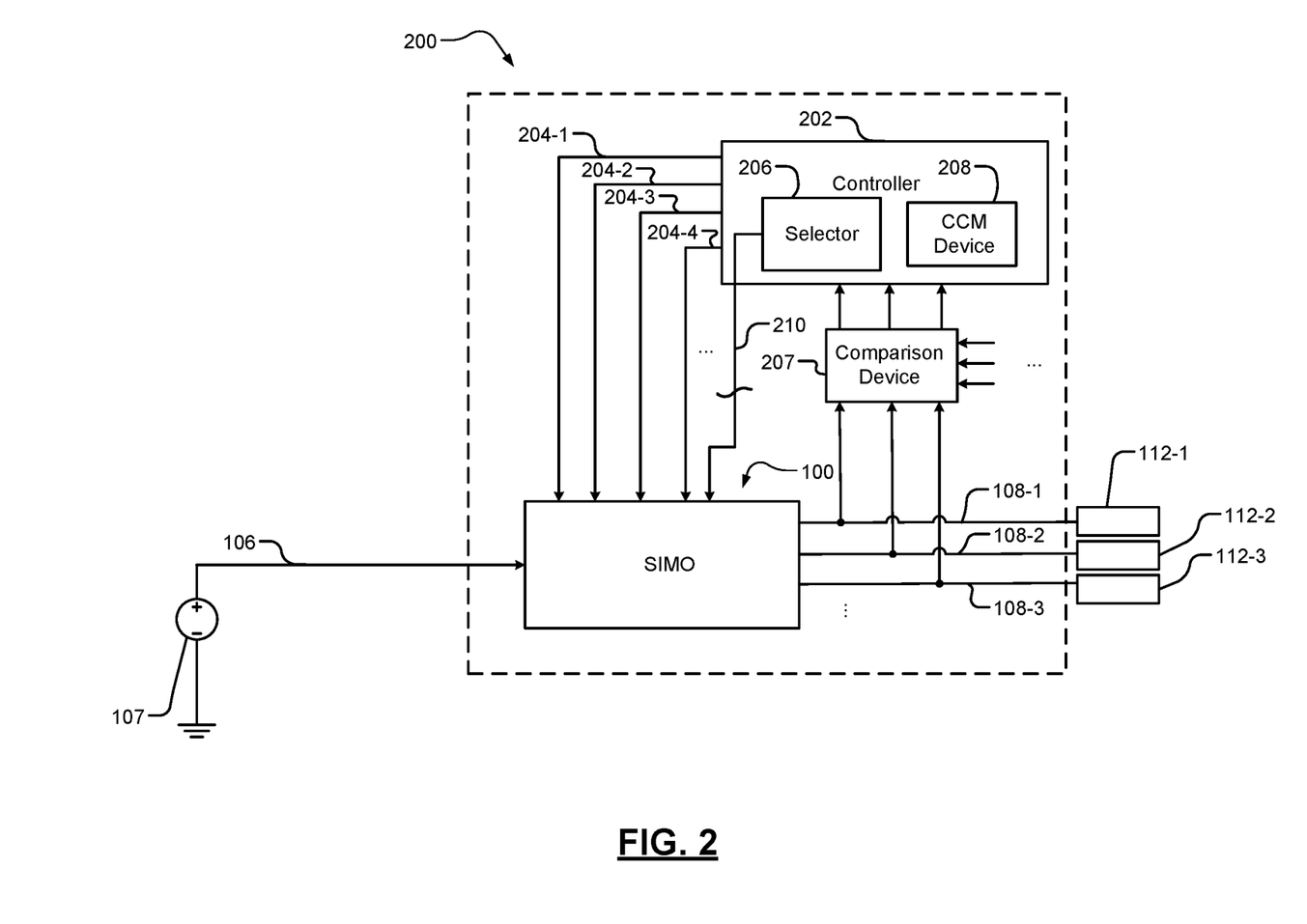
FIG. 2 is a schematic diagram illustrating a continuous conduction mode (CCM) SIMO device in accordance with an example implementation of the present disclosure.

FIG. 2 illustrates an example power converter 200 in accordance with the present disclosure. The power converter 200 includes the SIMO device 100 and a controller 202. The controller 202 receives the output signals from the outputs 108-1, 108-2, 108-3, and the controller 202 controls operation of the SIMO device 100 based on the output signals. For example, the controller 202 can selectively output control signals to corresponding gates of the transistors 102 to control charging or discharging of the inductor 104 and/or the capacitors 110-1, 110-2, 110-3 via outputs 204-1, 204-2, 204-3, 204-4. The outputs 204-1, 204-2, 204-3, 204-4 can be connected to one or more transistor 102 gates to control the inductor current.

The controller 202 includes a selector 206 that selects charging of the capacitors 110-1, 110-2, 110-3 based upon voltage requirements. In these implementations, the selector 206 provides control signals that selectively cause the SIMO device 100 to power the capacitors 110-1, 110-2, 110-3 based upon the voltage stored by the capacitors 110-1, 110-2, 110-3. The selector 206 receives comparison signals from a comparison device 207 and selects one of the outputs 108-1, 108-2, 108-3 to receive inductor current to recharge the corresponding capacitor 110-1, 110-2, 110-3. The selector 206 can be implemented in digital logic and determines a switching sequence for recharging the capacitors 110-1, 110-2, 110-3 based on the comparison signals. In implementations, the selector 206 includes priority logic that selects the sequence for charging a capacitor 110-1, 110-2, 110-3 if two or more capacitors require charging. The priority logic generate a priority signal for the selector 206 based on a load connected to the output 108-1, 108-2, 108-3, a relative priority of each output 108-1, 108-2, 108-3 with respect to one another, or the like.

The comparison device 207 can include one or more comparators that compare the voltage stored by the capacitor 110-1, 110-2, 110-3 with a reference voltage to determine whether the respective capacitor 110-1, 110-2, 110-3 requires charging. For example, if the voltage stored by one or more of the capacitors 110-1, 110-2, 110-3 is less than a corresponding reference signal, the comparison device 209 outputs a comparison signal indicative of the voltage difference.

The selector 206 receives the comparison signal and causes the inductor 104 to power a capacitor 110-1, 110-2, 110-3 during a first time period and to cause the inductor 104 to power another capacitor 110-1, 110-2, 110-3 during another time period via output 210. The output 210 includes multiple signal lines, and each signal line can be connected to a respective transistor 102 gate to control operation of the SIMO device 100.

The controller 202 can also cause the SIMO device 100 to operate in either CCM mode or DCM mode. When operating in CCM mode, a CCM device 208 causes the SIMO device 100 to maintain $I_{add}$ above zero Amps (0 A) between pulses.

Figure 3A:
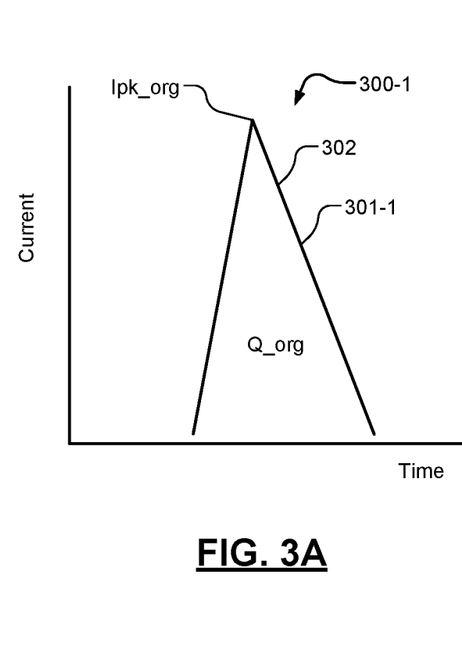
FIG. 3A is a graph illustrating an example inductor current waveform when a SIMO device is operating in discontinuous conductor mode (DCM)
Figure 3B:
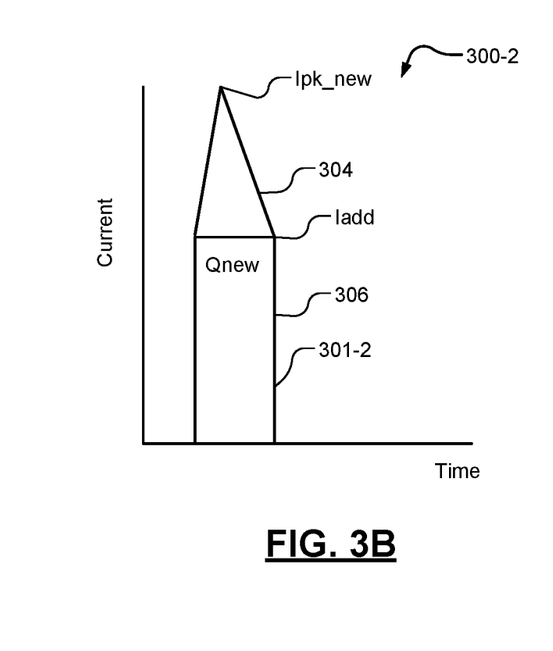
FIG. 3B is a graph illustrating an example inductor current waveform when a SIMO device is operating in CCM.

FIGS. 3A and 3B illustrate example graphs 300-1, 300-2 including waveforms 301-1, 301-2 representing inductor current through a SIMO for one pulse in buck mode (i.e., one cycle of selecting 102-3, 102-5 or 102-6), such as the SIMO device 100. Referring to FIG. 3A, the waveform 301-1 represents the charge value provided by the inductor current in DCM mode (Q_org). The charge value is equivalent to the area under the triangle 302. As shown, the current provided by the inductor current begins at zero Amps and increases to the current peak (Ipk_org) and then returns to zero Amps. In buck-boost mode and buck mode, the shape in FIG. 3A is the same, but the Q_org delivered to the load goes from Ipk_org to zero. The current from 0 to Ipk_org does not go to the output.

Referring to FIG. 3B, in buck-mode, when the SIMO device operates in CCM mode, the inductor current starts at valley current $I_{add}$ and then increases to the peak current (Ipk_new) and then returns to $I_{add}$ to deliver the desired charge to the output. The total value of the charge is equivalent to the areas of the triangle 304 and the rectangle 306. Since the inductor current is initially at $I_{add}$, the pulse width of Qnew is narrower with respect to Q_org to maintain the same charge delivered to 102-3, 102-5 or 102-6 per pulse. The CCM device 208 is configured to generate $I_{add}$ that is based on an output signal provided by difference between the outputs 108-1, 108-2, 108-3 of the SIMO device 100 and the corresponding target voltage signals. During a charging cycle, the CCM device 208 calculates an inductor charging current for the selected output 108-1, 108-2, 108-3. In one implementation, the inductor charging current is calculated based on the root-mean-square (RMS) of $I_{add}$ and Ipk_org. In another implementation, it can be an amount greater than the root-mean-square (RMS) of $I_{add}$ and Ipk_org. Similar to FIG. 3A, in buck-boost mode and buck mode, the shape of the current of FIG. 3B is the same, but the Q_org delivered to the load goes from Ipk_org to $I_{add}$. The current from $I_{add}$ to Ipk_org does not go to the output.

Figure 4:
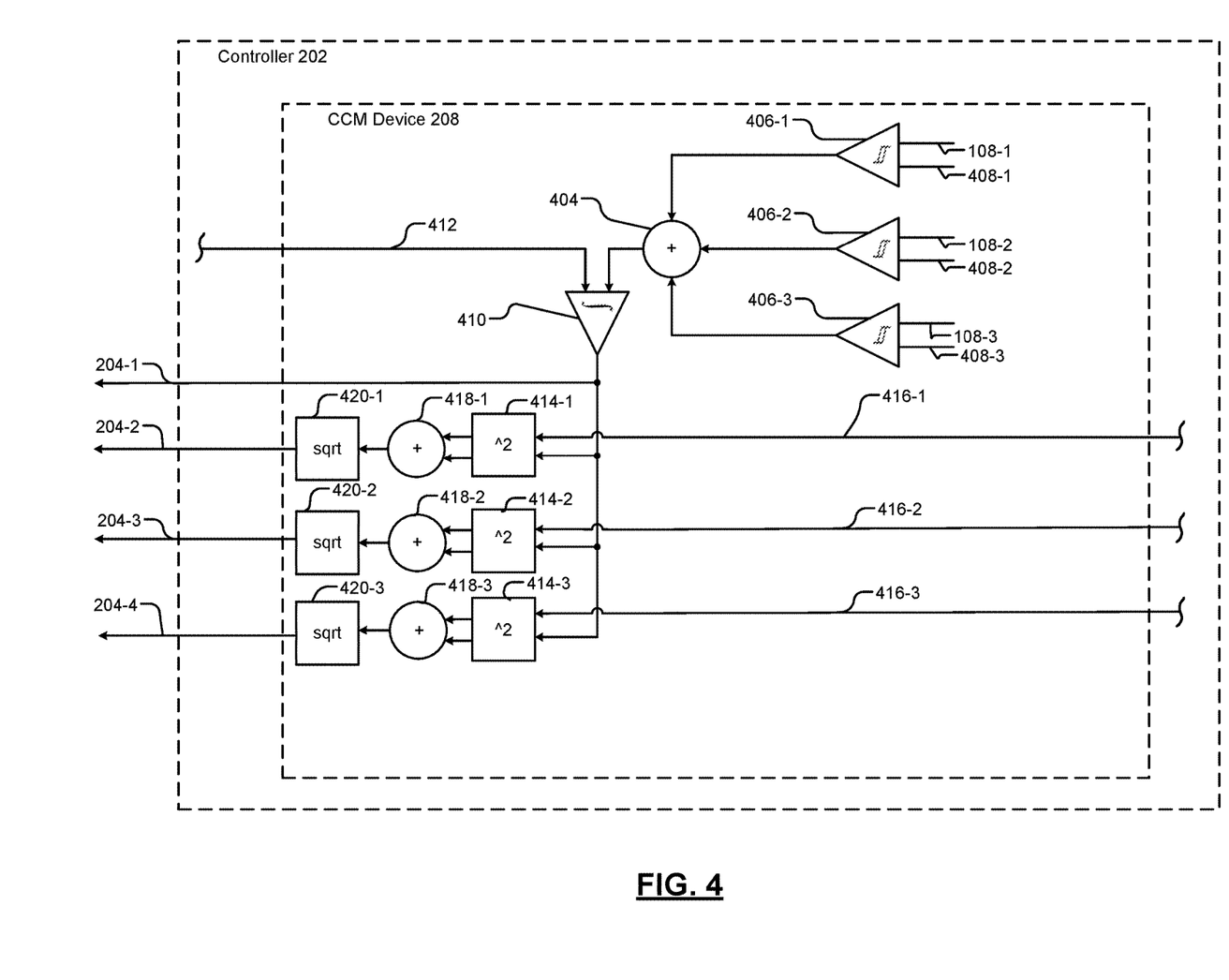
FIG. 4 is a schematic diagram illustrating a CCM device in accordance with an example implementation of the present disclosure.

FIG. 4 illustrates a CCM device 208 included in the controller 202. The CCM device 208 generates SIMO control signals to control operation of the SIMO device 100. For example, the CCM device 208 generates SIMO control signals to cause the SIMO device 100 to operate in either in the CCM mode or the DCM mode. The SIMO control signals are provided to the transistor gates of the SIMO device 100 to control the inductor current.

In an example implementation, the CCM device 208 includes a summer device 404 that receives difference signals from difference amplifiers 406-1, 406-2, 406-3. The difference amplifier 406-1 receives the output signal from output 108-1 and a target voltage signal from input 408-1. The difference amplifier 406-2 receives the output signal from output 108-2 and a target voltage signal from input 408-2. The difference amplifier 406-3 receives the output signal from output 108-3 and a target voltage signal from input 408-3. The target voltage signals may be pre-programmed values provided by a device, such as the controller 202 or the like, and represent the desired voltage for the corresponding outputs 108-1, 108-2, 108-3.

The difference amplifiers 406-1, 406-2, 406-3 output a signal indicative of a difference between the corresponding output signal and the target voltage signal and optionally include a minimum function in order to prevent a positive error on one output from being fully cancelled by another input (e.g., a negative error on 406-1 should not cancel a positive error on 406-2). In some instances, some negative error is needed to lower $I_{add}$ when a load is removed. A need for a rapid decrease in $I_{add}$ is offset by the fact that the power converter device 200 can include "short cycles" in which the inductor is shorted. For example, 102-2 and 102-4 can be turned on for a cycle if no load is requesting current. Still the short cycles are lossy and should be minimized. In some examples, a balance is required when selecting the level for a minimum function for 406-1, 406-2 and 406-3. The summer device 404 sums the signals provided by the difference amplifiers 406-1, 406-2, 406-3 and provides the summed signal to an integrator 410. However, it is understood that integrator 410 can be replaced by other loop filter and/or compensation schemes related to power conversion.

The integrator 410 receives the summed signal and a threshold signal from input 412. The threshold signal can be provided by the controller 202. In an example implementation, the threshold signal is initialized to zero. In another implementation, the threshold signal is a preprogrammed value based upon the configuration of the controller 202. The integrator 410 integrates the summed signal and the threshold signal and outputs $I_{add}$ at output 204-1.

The signal $I_{add}$ increases as the difference amplifiers 406-1, 406-2, 406-3 output signals increase, which indicates the integral of the difference between the target voltage value and corresponding output is increasing. The signal $I_{add}$ determines the minimum inductor current (e.g., valley current) maintained at the inductor 104 while the SIMO device 100 is operating in CCM mode.

The CCM device 208 also includes squaring devices 414-1, 414-2, 414-3 that receive the $I_{add}$ signal from the integrator 410 and a target current peak signal from corresponding inputs 416-1, 416-2, 416-3. The target current peak signals are characterized as programmable direct current (DC) signals and can be received from the controller 202. The target peak currents can be static or adjusted based on operation metrics of the SIMO converter such as output power levels. The target current peak signals represent a target current peak setting for a corresponding output 108-1, 108-2, 108-3. The target current peak signals correspond to Ipk_org since when $I_{add}$ equals zero, the RMS calculation passes these levels to 204-2,3,4 (sqrt(x^2+0^2)=x).

The squaring devices 414-1, 414-2, 414-3 square the $I_{add}$ signal and the corresponding target current peak signal and output the squared values to a corresponding summer 418-1, 418-2, 418-3. The summers 418-1, 418-2, 418-3 sum the corresponding squared signals and output a summed signal of the corresponding squared signals to a corresponding square root device 420-1, 420-2, 420-3. The square root devices 420-1, 420-2, 420-3 receive the corresponding summed squared signal and generate a signal representing the square root of the corresponding summed squared signal.

The square root devices 420-1, 420-2, 420-3 output the square root signal at corresponding outputs 204-2, 204-3, 204-4. The square root signal represents the root-mean-square (RMS) value of the $I_{add}$ signal and the corresponding target current peak signal. The outputs 204-1, 204-2, 204-3, 204-4 are used to control the one or more transistor gates of the SIMO device 100 to operate the SIMO device 100 in a CCM mode. For example, the inductor starts at $I_{add}$ from the previous cycle, outputs 204-2, 204-3, 204-4 provide signals that cause the inductor current to transition from $I_{add}$ to the desired current peak and then the inductor current is ramped down to $I_{add}$ determined by 204-1 so that the next cycle's inductor current will start again at $I_{add}$.

In various implementations, the squaring devices 414-1, 414-2, 414-3 may be a frequency mixer. For example, the squaring devices 414-1, 414-2, 414-3 may comprise a Gilbert cell, a translinear device, or the like. In various implementations, the square root devices 420-1, 420-2, 420-3 may be translinear devices or a gilbert multiplier in a feedback circuit to produce a square root.

Figure 5:
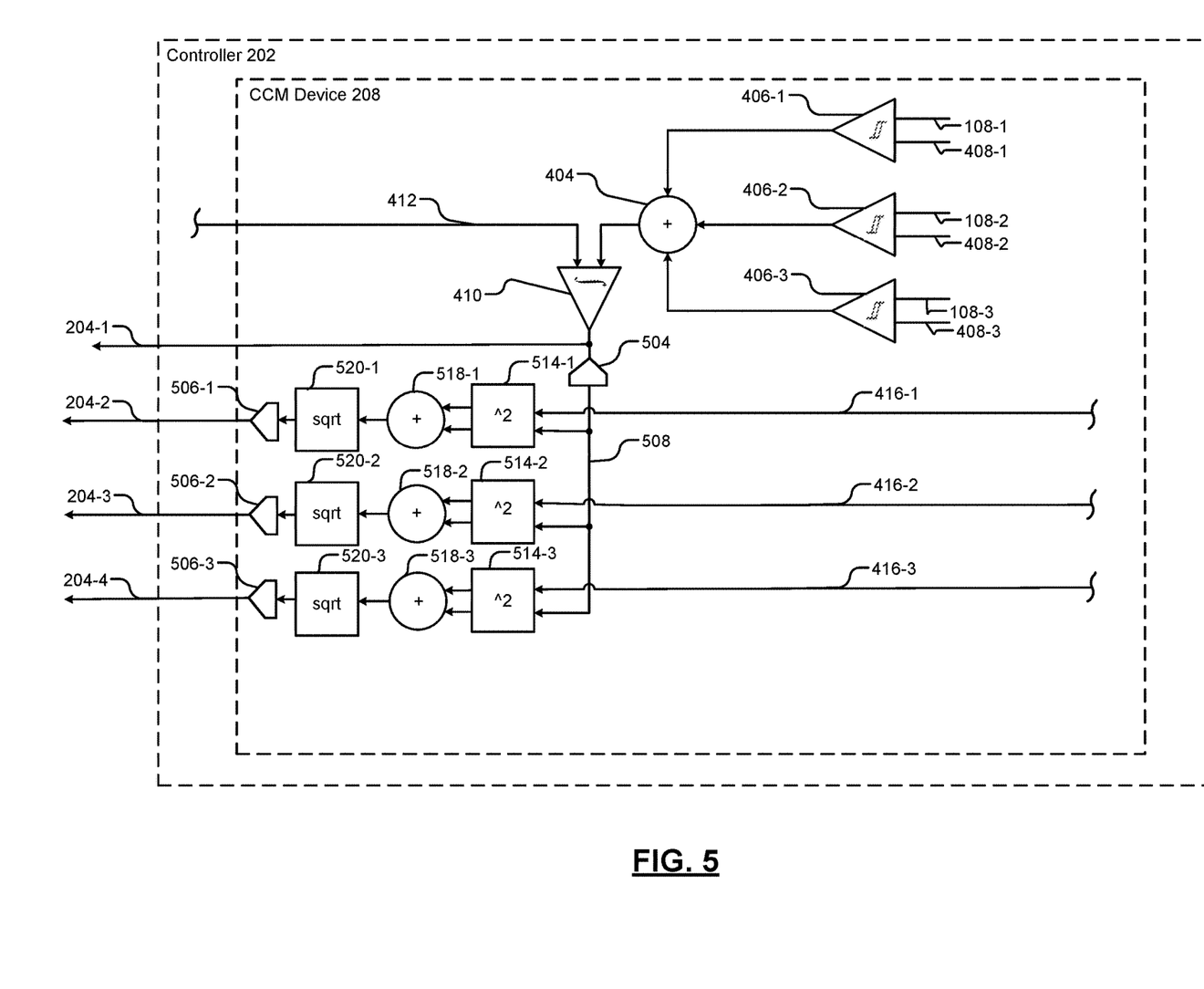
FIG. 5 is a schematic diagram illustrating another CCM device in accordance with an example implementation of the present disclosure.

FIG. 5 illustrates another implementation of a CCM device 208. As shown in FIG. 5, the CCM device 208 includes an analog-to-digital converter 504 and digital-to-analog converters 506-1, 506-2, 506-3. The analog-to-digital converter 504 receives the $I_{add}$ signal from the integrator 410 and outputs a digital representation of the $I_{add}$ signal at output 508.

The CCM device 208 also includes squaring devices 514-1, 514-2, 514-3 that receive the digital representation of the $I_{add}$ signal from the analog-to-digital converter 504 and a target current peak signal from corresponding inputs 416-1, 416-2, 416-3. The squaring devices 514-1, 514-2, 514-3 square the digital representation of the $I_{add}$ signal and the corresponding target current peak signal and output the squared values to a corresponding summer 518-1, 518-2, 518-3. The summers 518-1, 518-2, 518-3 sum the corresponding squared signals and output a summed signal of the corresponding squared signals to a corresponding square root device 520-1, 520-2, 520-3. The square root devices 520-1, 520-2, 520-3 receive the corresponding summed squared signal and generate a signal representing the square root of the corresponding summed squared signal.

The square root devices 520-1, 520-2, 520-3 output the square root signal at corresponding outputs 204-2, 204-3, 204-4 to the digital-to-analog converters 506-1, 506-2, 506-3. The square root signal represents the root-mean-square value of the digital representation of the $I_{add}$ signal and the corresponding target current peak signal. The digital-to-analog converters 506-1, 506-2, 506-3 convert the corresponding square root signal to an analog representation of the square root signal. The analog representation of the square root signal is provided to one or more transistor gates of the SIMO device 100 to cause the inductor current to transition from $I_{add}$ to the desired current peak.

In various implementations, the squaring devices 514-1, 514-2, 514-3 may be a multiplier, such as a binary multiplier. In various implementations, the square root devices 520-1, 520-2, 520-3 may be implemented in suitable combinatorial logic or a look-up table.

Figure 6:
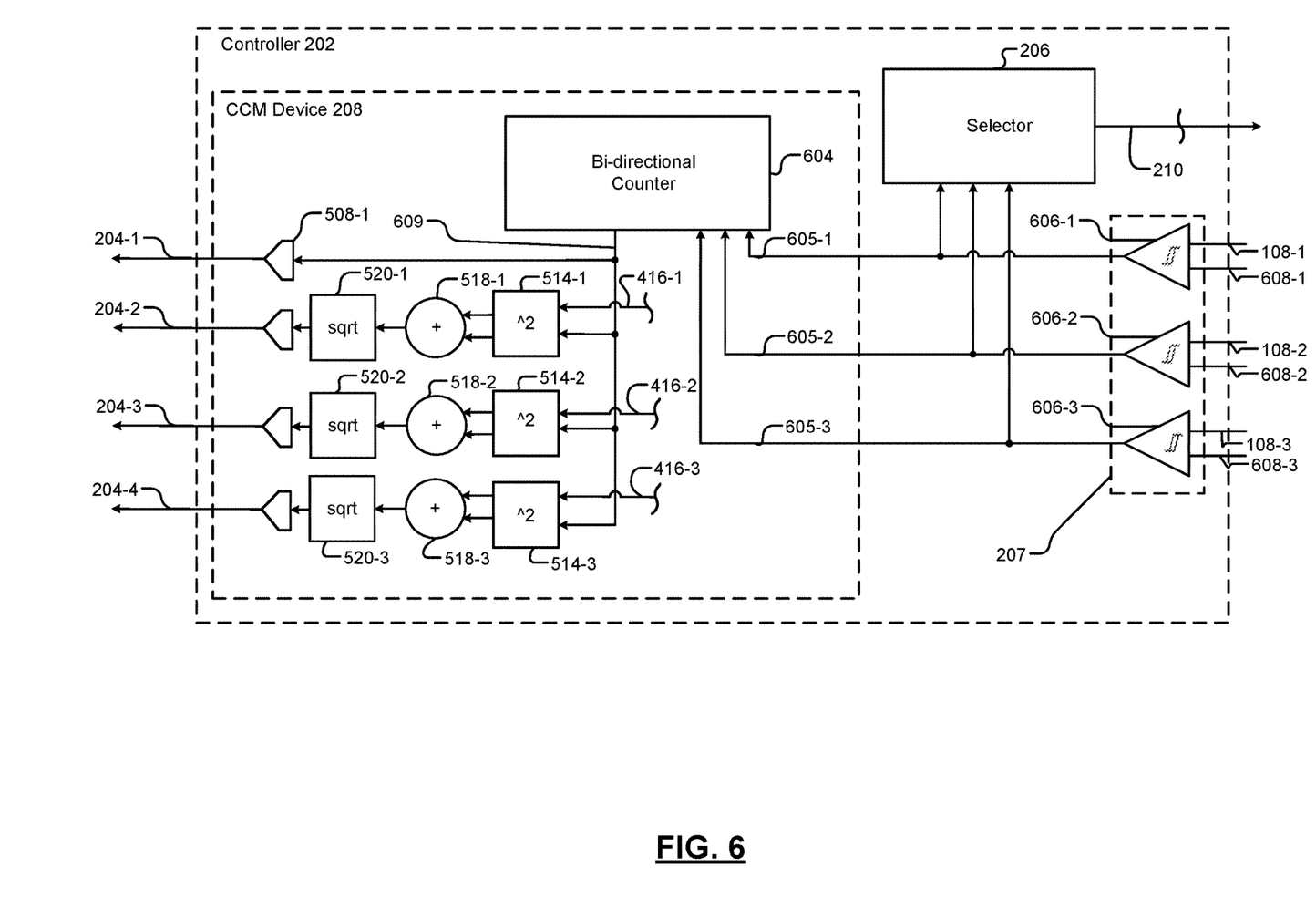
FIG. 6 is a schematic diagram illustrating another CCM device in accordance with an example implementation of the present disclosure.

FIG. 6 illustrates another example implementation of a CCM device 208. The CCM device 208 includes a bi-directional counter 604. In an implementation, the bi-directional counter 604 receives one or more input signals from the comparison device 207. In an implementation, the comparison device 207 includes comparators 606-1, 606-2, 606-3. The comparators 606-1, 606-2, 606-3 compare a voltage signal received from a corresponding output 108-1, 108-2, 108-3 to a corresponding reference voltage signal received at input 608-1, 608-2, 608-3. The comparators 606-1, 606-2, 606-3 output a comparison signal based on the comparison at outputs 605-1, 605-2, 605-3.

The voltage signal represents the voltage stored by a corresponding capacitor 110-1, 110-2, 110-3. The bi-directional counter 604 generates the $I_{add}$ signal based upon the comparison signals output by the comparators 606-1, 606-2, 606-3 using a minimum count function on each input similar as to described with reference to 406-1, 406-2, 406-3. The $I_{add}$ signal is output at 609.

A digital-to-analog converter 610-1 converts the $I_{add}$ signal to a digital representation of the $I_{add}$ signal and outputs the digital representation at the output 204-1.

Similar to the CCM device illustrated in FIG. 5 and described above, the squaring devices 514-1, 514-2, 514-3 receive the $I_{add}$ signal from the bi-directional counter 604 and a target current peak signal from corresponding inputs 416-1, 416-2, 416-3. The squaring devices 514-1, 514-2, 514-3 square the $I_{add}$ signal and the corresponding target current peak signal and output the squared values to a corresponding summer 518-1, 518-2, 518-3. The summers 518-1, 518-2, 518-3 sum the corresponding squared signals and output a summed signal of the squared signals to a corresponding square root device 520-1, 520-2, 520-3. The square root devices 520-1, 520-2, 520-3 receive the corresponding summed squared signal and generate a signal representing the square root of the corresponding summed squared signal.

The square root devices 520-1, 520-2, 520-3 output the square root signal to the digital-to-analog converters 506-1, 506-2, 506-3. The digital-to-analog converters 506-1, 506-2, 506-3 convert the corresponding square root signal to an analog representation of the square root signal and output the analog representation at corresponding outputs 204-2, 204-3, 204-4. The signals output at outputs 204-2, 204-3, 204-4 are provided to one or more transistor gates of the SIMO device 100 to control operation of the SIMO device 100.

Figure 7:
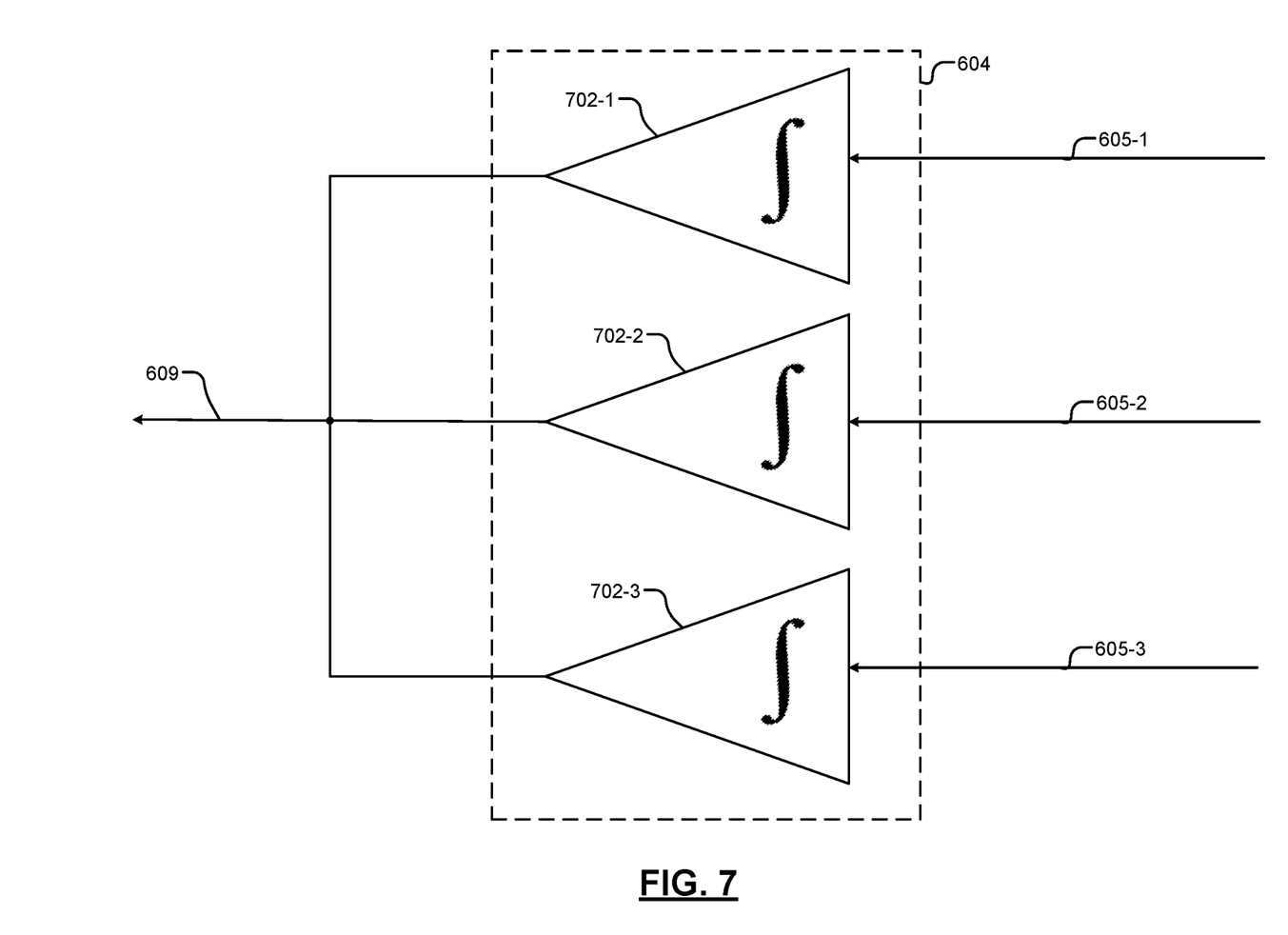
FIG. 7 is a schematic diagram illustrating a bidirectional counter and a comparison device in accordance with an example implementation of the present disclosure.

FIG. 7 illustrates an example bidirectional counter 604 according to an example implementation. The bidirectional counter 604 includes integrators 702-1, 702-2, 702-3. The integrators 702-1, 702-2, 702-3 receive a corresponding control signal from the outputs 605-1, 605-2, 605-3 of the charge prioritization device 206. The integrators 702-1, 702-2, 702-3 each integrate the corresponding control signal, and the integrated signal is output as $I_{add}$ at 609.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A power converter comprising:
a Single-Input-Multiple-Output (SIMO) device including:
a first transistor connected to an input and a first end of an inductor;
a second transistor connected to a second end of the inductor and a first output;
a third transistor connected to the second end of the inductor and a second output; and
a controller connected to the SIMO device and configured to maintain an inductor current through the inductor between charging cycles and to cause the inductor current to transition to a charging inductor current during a charging cycle,
wherein the charging inductor current is based on a difference between an output voltage signal and a reference voltage signal,
wherein the controller includes a bidirectional counter configured to generate an inductor current signal corresponding to the inductor current based on a difference between (1) the output voltage signal provided by at least one of the first output and the second output and (2) the reference voltage signal,
wherein the controller is configured to generate a charging inductor current signal based on the inductor current signal and a target current peak signal, and
wherein the charging inductor current signal comprises a root-mean-square (RMS) of the inductor current and the target current peak signal.

2. The power converter as recited in claim 1, wherein the controller further comprises:
a squaring device configured to generate a squared inductor current signal and a squared target current peak signal;
a summer connected to an output of the squaring device and configured to generate a summed signal based on the squared inductor current signal and the squared target current peak signal; and
a square root device that is connected to an output of the summer and configured to generate the target current peak signal based on the summed signal.

3. The power converter of claim 2, wherein the squaring device comprises a frequency mixer.

4. The power converter of claim 2, wherein the squaring device includes a multiplier.

5. The power converter of claim 2, wherein the square root device comprises a translinear amplifier.

6. The power converter of claim 2, wherein the square root device comprises a look-up table.

7. The power converter of claim 2, wherein the controller further comprises:
an analog-to-digital converter connected to an output of the bidirectional counter and configured to generate a digital representation of the inductor current, wherein the squaring device is connected to an output of the analog-to-digital converter; and
a digital-to-analog converter connected to an output of the square root device and configured to generate an analog representation of the target current peak signal.

8. The power converter of claim 1, wherein the target current peak signal comprises a programmable direct current (DC) signal representing a target current peak setting for at least one of the first output and the second output.

9. The power converter of claim 1, wherein the controller is configured to generate a second charging inductor current signal based on the inductor current signal and a target current peak signal for the second output.

10. A power converter comprising:
a Single-Input-Multiple-Output (SIMO) device including:
a first transistor connected to an input and a first end of an inductor;
a second transistor connected to a second end of the inductor and a first output;
a first capacitor connected to the first output;
a third transistor connected to the second end of the inductor and a second output; and
a second capacitor connected to the second output;
a controller connected to the SIMO device and including:
a first comparator configured to generate a first comparison based on the first output and a first target voltage of the first output;
a second comparator configured to generate a second comparison based on the second output and a second target voltage of the second output; and
a bidirectional counter configured to generate an additional inductor current based on the first and second comparisons,
wherein the controller is configured to, via switching of the first, second, and third transistors, during charging of at least one of the first and second capacitors, maintain a current through the inductor greater than zero and control the current through the inductor based on the additional inductor current and first and second target peak currents through the inductor.

11. The power converter of claim 10 wherein the bidirectional counter is configured to set the additional inductor current based on the first and second comparisons using a minimum count function.

12. The power converter of claim 10 wherein the controller is configured to determine a switching sequence for the first, second, and third transistors using digital logic.

13. The power converter of claim 10 wherein the controller further includes:
  a first squaring device configured to generate a first squared value of the additional inductor current and a first squared value of the first target peak current;
  a first summer configured to generate a first sum of the first squared value of the additional inductor current and the first squared value of the first target peak current; and
  a first square root device configured to generate a first square root based on a square root of the first sum,
  wherein the controller is configured to control switching of the first, second, and third transistors based on the first square root.

14. The power converter of claim 13 wherein the controller further includes:
  a second squaring device configured to generate a second squared value of the additional inductor current and a second squared value of the second target peak current;
  a second summer configured to generate a second sum of the second squared value of the additional inductor current and the second squared value of the second target peak current; and
  a second square root device configured to generate a second square root based on a square root of the second sum,
  wherein the controller is configured to control switching of the first, second, and third transistors further based on the second square root.

15. The power converter of claim 14 wherein the controller further includes:
  a first digital to analog converter configured to convert the first square root into a first analog representation of the first square root and to apply the first analog representation to a first gate terminal of the second transistor; and
  a second digital to analog converter configured to convert the second square root into a second analog representation of the second square root and to apply the second analog representation to a second gate terminal of the third transistor.

16. The power converter of claim 10 wherein the bidirectional counter includes a plurality of integrators configured to generate the additional inductor current.

17. The power converter of claim 16 wherein the integrators are configured to generate the additional inductor current based on integrating outputs, respectively, a selector.

18. The power converter of claim 17 wherein the selector generates the outputs based on first and second voltages of the first and second capacitors, respectively.

19. The power converter of claim 18 wherein the selector generates the outputs using priority logic for a sequence for charging the first and second capacitors.

20. The power converter of claim 18 wherein the selector generates the outputs further based on first and second reference voltages for the first and second capacitors, respectively.

* * * * *